Dec. 23, 1958  A. W. HARRIS ET AL  2,865,823
METHOD OF RECLAIMING WASTE PICKLE LIQUOR
Filed June 4, 1957
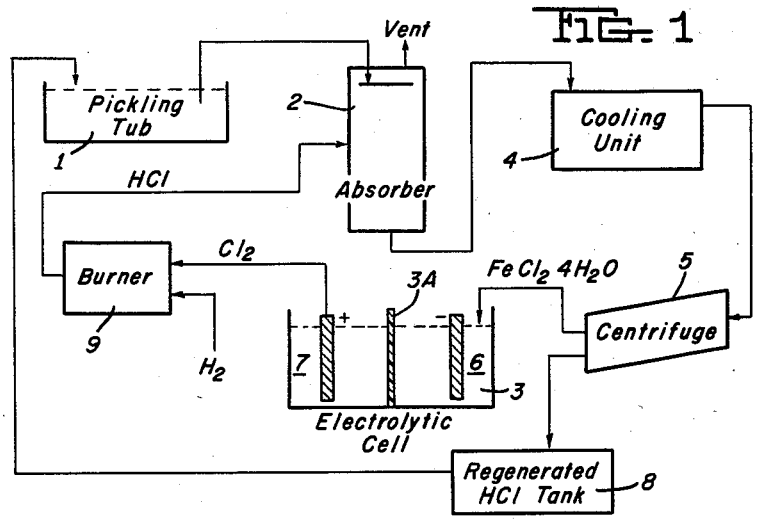
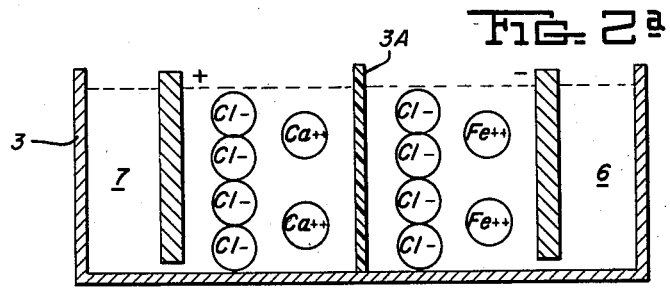
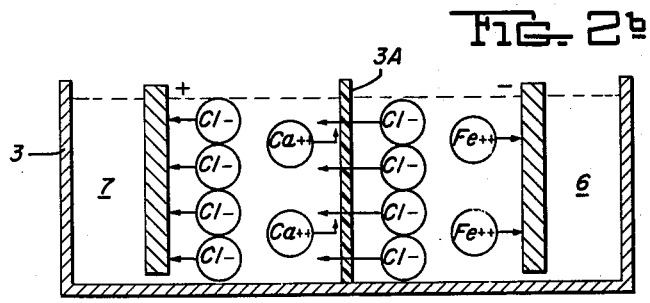
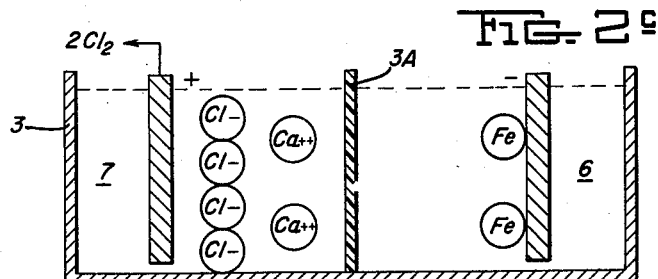
INVENTORS
ARCH W. HARRIS and
CHARLES D. STRICKER
By Donald G. Dalton
Attorney

United States Patent Office 2,865,823
Patented Dec. 23, 1958

2,865,823

METHOD OF RECLAIMING WASTE PICKLE LIQUOR

Arch W. Harris, Warrensville Township, Cuyahoga County, and Charles D. Stricker, Shaker Heights, Ohio, assignors to United States Steel Corporation, a corporation of New Jersey Application June 4, 1957, Serial No. 663,540

6 Claims. (Cl. 204—151)

This invention relates to the reclamation of waste pickle liquor and, in particular to the recovery of the value in hydrochloric-acid pickle liquor.

This is a continuation-in-part of our application Serial No. 580,591, filed April 25, 1956, now abandoned.

The treatment of waste sulphuric-acid pickle liquor is general practice to prevent stream pollution. The greater cost of hydrochloric acid furnishes an even stronger incentive for treating the pickle liquor made therefrom, when it has become spent so far as further economical pickling action is concerned. We have invented a novel process for such treatment yielding regenerated acid and metallic iron. The treatment involves introducing hydrogen-chloride gas into the liquor, the removal of ferrous-chloride crystals therefrom and the electrolysis of an aqueous solution of the crystals in a so-called "permselective" cell to produce chlorine and electrolytic iron. The chlorine is then burned in hydrogen to furnish the hydrogen-chloride gas used in the first step.

A complete understanding of the invention may be obtained from the following detailed description and explanation which refer to the accompanying drawings illustrating the present preferred practice. In the drawings:

Figure 1 is a flow sheet illustrating diagrammatically the several steps of the process; and Figures 2A, 2B and 2C are diagrams illustrating the electrolysis in a permselective cell.

Referring now in detail to the drawings and for the present, to Figure 1, a pickling tub 1 is filled originally with dilute hydrochloric acid which is partially converted to ferrous chloride by contact with steel products immersed therein for scale removal. When the acid content is reduced to a concentration at which pickling can no longer be effected at the desired rate, a portion of the solution is pumped to the top of an absorber or trickle tower 2. Hydrogen-chloride gas is introduced into the absorber where is makes contact with and becomes dissolved in the waste liquor, building up the acid content thereof from 5–10% to 20–25%. From the absorber, the solution is conducted through a heat-exchanger 4 wherein it is cooled substantially to room temperature.

By reason of the increased concentration of hydrogen chloride and the cooling thus effected, $FeCl_2 \cdot 4H_2O$ crystals are precipitated in the liquor and a slurry thereof is delivered to a filter or centrifuge 5. From the centrifuge, the regenerated acid, still containing some $FeCl_2$ (e. g., 25–30% HCl and 4–5% $FeCl_2$), flows to a storage tank 8. The $FeCl_2 \cdot 4H_2O$ crystals separated from the slurry are added at a controlled rate to an aqueous solution thereof in the cathode chamber 6 of a compartment or permselective electrolytic cell 3 having a median transverse anion membrane 3A. The anode chamber 7 of the cell contains a solution of $CaCl_2$, between .5 N and 1.5 N, preferably about 1 N. Some $CaCl_2$ (e. g., 3%) may also be added to the catholyte to increase its conductivity. The membrane 3A is permeable by Cl⁻ ions but not by $Ca^{++}$ ions. Membrane material of this character is well known and available commercially. An example is the product disclosed in Bodamer Patent No. 2,681,319. Permselective cells are described in an article in "Industrial and Engineering Chemistry" for January 1955, on pp. 67–70.

Cell 3 is preferably maintained at a temperature of from 80 to 200° F. This increases the conductivity and also vaporizes the water of crystallization carried by the ferrous-chloride addition. Electrolysis in the cell causes plating of iron at the cathode and release of chlorine at the anode. The addition of ferrous chloride to the catholyte is controlled so that the rate of addition is approximately equivalent to that at which iron is deposited and chlorine released. The concentration of the catholyte is from 2 N to 6 N and is preferably maintained at about 5 N. The spacing of the cell electrodes is preferably about 1 inch, the current density 40 to 200 amps. p. s. f. and the voltage 3.5–4 volts. The electrodes may be of stainless steel. Suitable provision must be made, of course, for collecting the chlorine escaping at the anode.

Figures 2A, 2B and 2C illustrate the several stages in the operation of the cell 3. Figure 2A shows the cell conditions prior to the application of voltage. Figure 2B shows the travel of the ions under applied voltage. The Cl⁻ ions penetrate membrane 3A but the $Ca^{++}$ ions are confined by it. Figure 2C shows the result of ion migration, i. e., the plating of iron on the cathode and the release of chlorine gas at the anode.

The chlorine produced by the electrolysis is burned in a hydrogen atmosphere in chamber 9 and the resulting hydrogen-chloride gas is supplied to absorber 2 for regenerating fresh quantities of spent liquor from tub 1.

Our method is simple, completely continuous and requires a minimum of attention. The only material which has to be supplied is the hydrogen. The regenerated acid when diluted to 15% HCl contains only 2 to 3% $FeCl_2$. The iron is recovered in the form of electrolytic plates which can be charged into the blast furnace.

The membrane cell affords a highly concentrated catholyte ($FeCl_2$ solution) and therefore requires only a low voltage. There is no loss of iron salts in electrolysis. The iron is plated as a relatively smooth and adherent coating on the cathode. There is only a small loss of current in first plating out the free acid because only the $FeCl_2 \cdot 4H_2O$ and the occluded HCl are electrolyzed.

Although we have disclosed herein the preferred practice of our invention, we intend to cover as well as any change or modification therein which may be made without departing from the spirit and scope of the invention.

We claim:

1. A method of reclaiming waste hydrochloric-acid pickle liquor which consists in dissolving hydrogen-chloride gas in the liquor until the acid concentration thereof is substantially increased, cooling the liquor to cause crystallization of ferrous chloride, separating the crystals from the liquor and electrolyzing a water solution of the crystals in an electrolytic cell having a median transverse anion membrane thereby depositing iron at the cathode and releasing chlorine at the anode, then burning the chlorine in a hydrogen atmosphere and dissolving the resulting hydrogen chloride in further quantities of waste pickle liquor.

2. A method of reclaiming waste hydrochloric-acid pickle liquor which consists in dissolving from 10 to 20% of hydrogen-chloride gas in the liquor until the hydrochloric acid concentration is from 20 to 25%, cooling the liquor to crystallize ferrous chloride, separating the crystals from the liquor, electrolyzing a water solution of the crystals in a cell wherein an anionic membrane separates the anode and cathode thereby depositing iron at the cathode and releasing chlorine at the anode, burning the chlorine in a hydrogen atmosphere to form fresh hydrogen chloride and contacting the hydrogen chloride so formed with additional liquor.

3. A method according to claim 2, characterized by maintaining the electrolyte at a temperature between 80 and 200° F.

4. A method according to claim 2, characterized by maintaining the water solution of ferrous-chloride crystals at a concentration between 2 N and 6 N.

5. A method according to claim 2, characterized by conducting said electrolysis at a current density of from 40 to 200 amps. p. s. f.

6. A method according to claim 2, characterized by conducting said electrolysis with a water solution of calcium chloride between .5 N and 1.5 N as an anolyte.

References Cited in the file of this patent

UNITED STATES PATENTS

| 2,393,582 | Agnew | Jan. 29, 1946 |
| 2,706,709 | Wintersberger | Apr. 19, 1955 |
| 2,785,999 | Ruthner | Mar. 19, 1957 |

FOREIGN PATENTS

| 12,551 | Australia | Dec. 10, 1928 |
| 309,268 | Great Britain | Apr. 11, 1929 |

OTHER REFERENCES

"Amherplex Ion Permeable Membranes," by Rohm & Haas Co., Philadelphia, Pa. (1952), pp. 10 to 14.